June 21, 1949.                    M. L. ANDERSON                    2,473,841
                                  FLEXIBILITY TESTER
Filed June 6, 1946                                               2 Sheets-Sheet 1
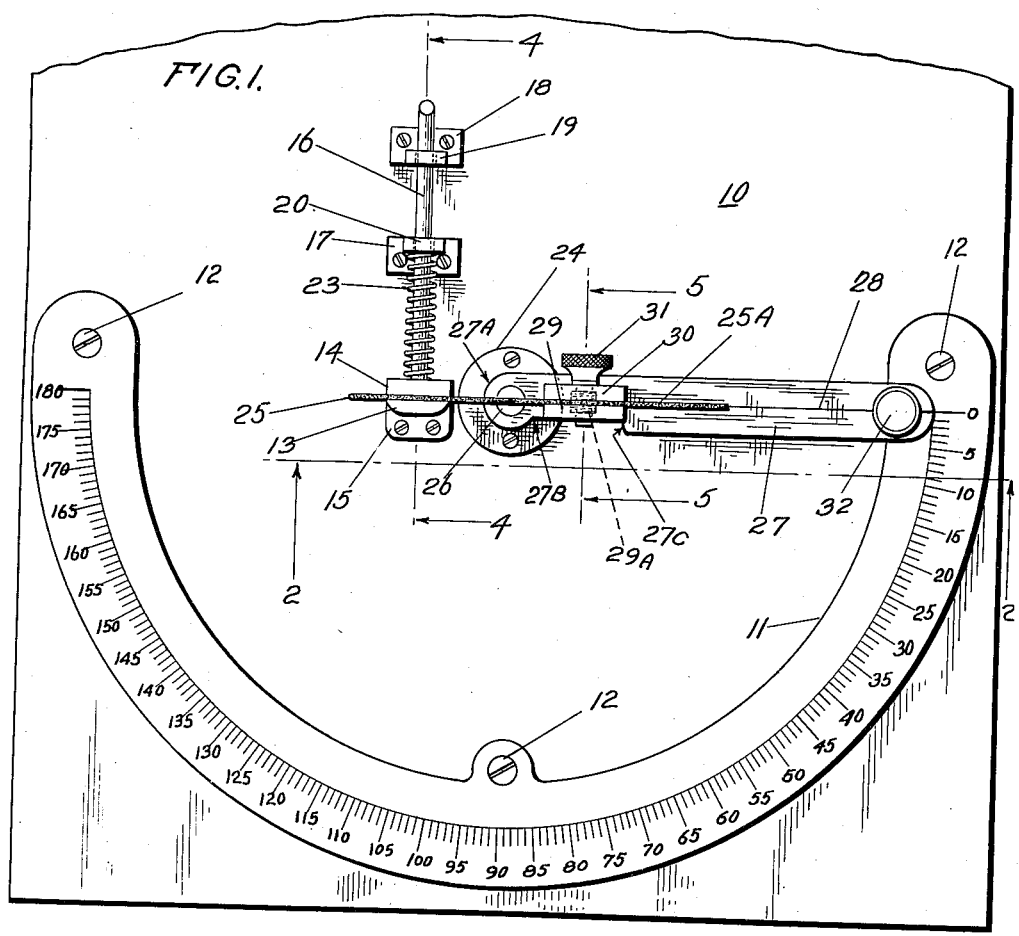
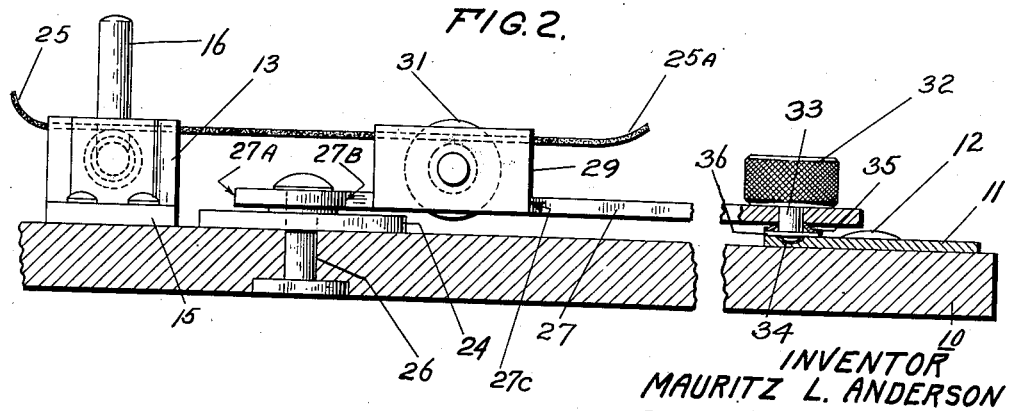
INVENTOR
MAURITZ L. ANDERSON

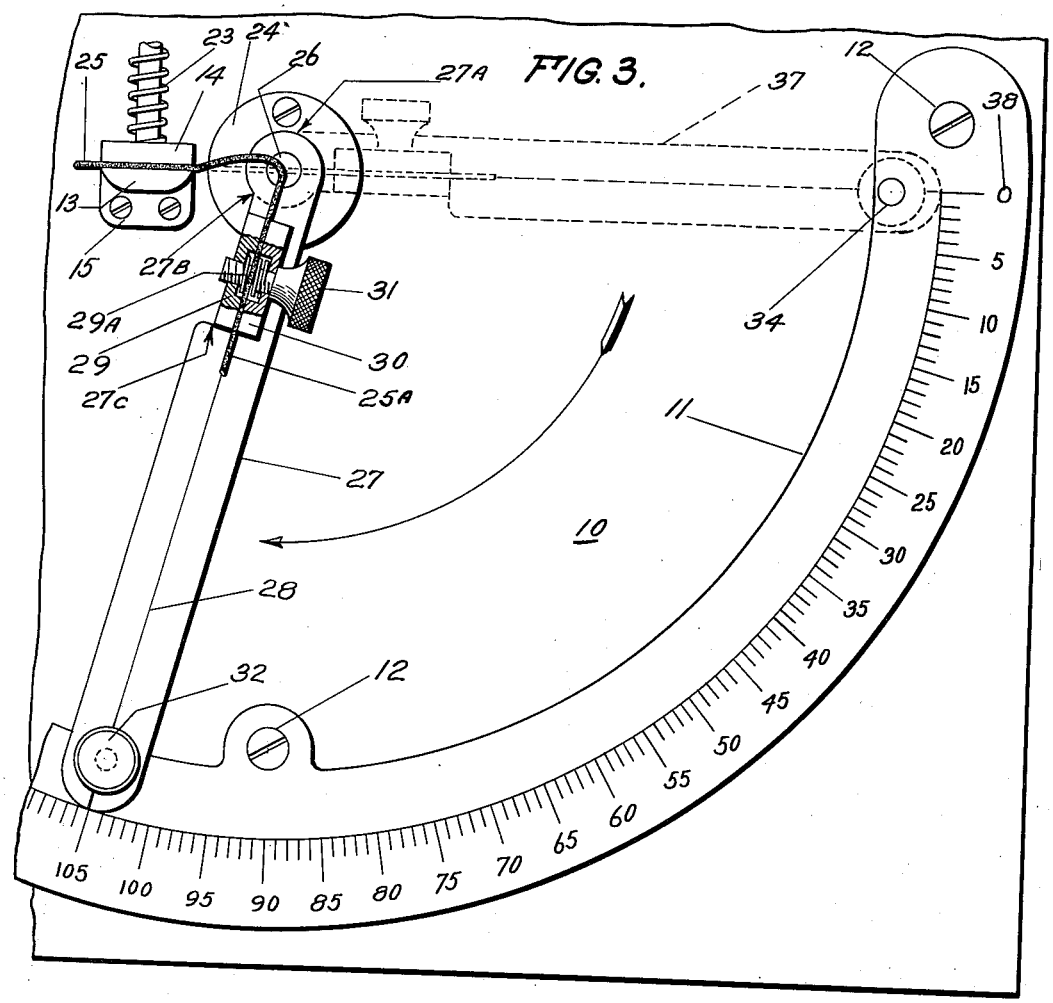
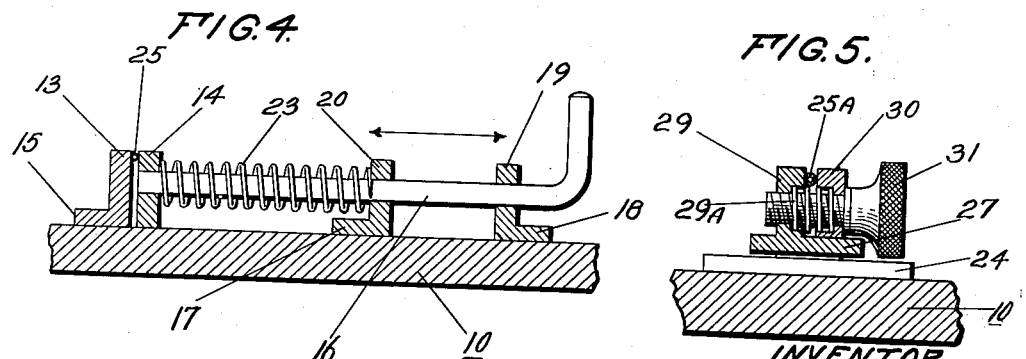
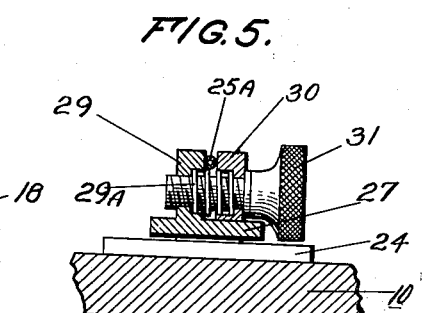

Patented June 21, 1949

2,473,841

UNITED STATES PATENT OFFICE 2,473,841

FLEXIBILITY TESTER

Mauritz L. Anderson, Arlington, Mass., assignor to Raytheon Manufacturing Company, Newton, Mass., a corporation of Delaware Application June 6, 1946, Serial No. 674,745

2 Claims. (Cl. 73—100)

This invention is directed to apparatus for testing the flexibility of materials subjected to strain induced by bending and is more particularly directed to the testing of heater coatings of a hard ceramic nature.

Previous methods employed for testing the flexibility of materials used for coating heater wire were conducted along lines based on trial and error. The coated heater wire under test was flexed by hand until the coating broke. If the coating broke down at an unsatisfactory bending angle, the exact value of which was a very wide guess, a new coating was tried. This method proved very unsatisfactory as it was impossible to establish a definite reference point to which the flexibility of other coatings could be compared.

It is, therefore, an object of the present invention to provide a device which will establish the breaking point based on the angle of rotation through which the tested material is bent.

The above object and others will become more evident as the description of the present invention progresses and is illustrated by the attached drawings in which:

Fig. 1 is a plan view of the device of the present invention;

Fig. 2 is a cross-sectional view along line 2—2 of Fig. 1;

Fig. 3 is a partial view of the device of the present invention depicting the operation of said device;

Fig. 4 is a cross-sectional view along line 4—4 of Fig. 1; and

Fig. 5 is a cross-sectional view along line 5—5 of Fig. 1.

Referring now more particularly to Fig. 1, a flat member 10, which be constructed of plywood, Masonite, Bakelite or the like, serves as a support for a scale 11, said scale being attached to member 10 by screws 12, or said scale may be inscribed directly on the surface of member 10. Also attached to said member 10 is a clamping mechanism comprising a pair of clamping jaws, jaw 13 being immovably attached to member 10 and jaw 14 being movable, said movable jaw when withdrawn from contact with jaw 13 allowing the insertion of the coated wire 25 between said jaws 13 and 14. Fixed jaw 13 is integral with and perpendicular to its supporting member 15. An elongated member 16 is firmly attached to jaw 14 for manually withdrawing said jaw from contact with jaw 13. Said member 16 is maintained in proper alignment by a pair of guide members 17 and 18. Integral with said last-named members 17 and 18 are portions 19 and 20 perpendicular to said members 17 and 18, said portions 19 and 20 having apertures through which the member 16 passes with a slidable fit. Surrounding member 16 is a resilient member 23, which may be a helical spring disposed between vertical portion 20 and movable jaw 14 for urging said jaw into firm contact with jaw 13. Said resilient member 23 should have sufficient tension to firmly hold the coated wire 25 in place.

Also attached to member 10 is a disk member 24 for supporting a pivotal member 26. The configuration of member 24 was arbitrarily selected in this particular embodiment and can therefore be formed in any manner desired. Further, although the present embodiment indicates a supported pivotal member, said member can be made integral with its support, for example, by turning such a combination from a single piece of material.

Rotatably attached to the pivotal member 26 is an indicating pointer 27 having an inscribed line 28 on its upper surface, said line extending to the unattached end of member 27 and being radially disposed with respect to scale 11. Pointer 27 is rounded at the pivotal end 27A thereof and the lower edge of said pointer 27 extends from a point 27B on said rounded edge 27A so that the width of said pointer between 27B and 27C is such that it will allow substantial rotation of same.

Integral with member 27 and perpendicular to the plane surface thereof is portion 29, said portion being the fixed jaw of a second clamping assembly, the movable jaw 30 of said last-named assembly being maintained in juxtaposition to said fixed jaw 29 by threaded member 31. Jaw 30 is under tension by reason of the pressure exerted upon it by resilient member 29A, said member 29A surrounding member 31 and being disposed between the jaws 29 and 30. Said member 31 passes through, with a slidable fit, an aperture (not shown) in movable jaw 30 and threadedly engages with fixed jaw 29. Rotation of threaded member 31 urges movable jaw 30 into firm contact with fixed jaw 29 for firmly holding in place the other portion of coated wire 25A.

Fig. 2 illustrates a partial cross-section along line 2—2 of Fig. 1 of the device to show in detail means for momentarily restraining the motion of pointer 27. The pointer actuating knob 32 in this particular embodiment has an extended portion 33 which engages an indent 34 in scale 11. Said extended portion 33 is held in engagement with indent 34 by the combination of washer 36 and resilient member 35. The washer 36 is held in position on extended portion 33 in a circumferential groove (not shown) thereon, the washer being forced into said groove (not shown) after the resilient member 35 is placed in position. Resilient member 35 exerts sufficient pressure against the washer, by reason of its disposal between said washer 36 and the underside of pointer 27, to urge said extended portion 33 into engagement with indent 34. Very little force is required to disengage the pointer from its position. Indent 34 is used to hold the pointer 27 in position while inserting the coated wire sample between the clamping jaws 29 and 30.

The operation of the device is clearly illustrated in Fig. 3, the broken lines 37 showing the position of pointer 27 before it is actuated and the full line illustration of pointer 27, after being rotated in a clockwise direction through a length of arc from zero position 38, showing how the coated wire 25 is formed into a loop. Actuation of pointer 27 is continued in the direction above indicated until the coating on looped wire 25 breaks. At this point, note is made of the number of degrees through which said pointer was rotated and this figure represents a relative value of the flexibility of the coating on coated wire 25. Although the scale 11 in this particular embodiment was inscribed in degrees of angular rotation, any other form of indicia may be used.

The distance between clamps 13, 14 and 29, 30 when same are in linear relation with each other and the zero reference point 38 is sufficient to allow the greatest amount of rotation of pointer 27 without interference by clamping support 15 but does not exceed a distance which would inhibit the formation of a small enough loop to properly establish the flexibility of the coating on coated wire 25.

Fig. 4 illustrates more clearly in cross-section the fixed clamping means 13 and 14 and the manner in which said clamping means are operated. These means provide rapid insertion or removal of the sample 25 undergoing the test by manipulation of member 16.

In Fig. 5 is illustrated in cross-section the arrangement of clamping jaws 29 and 30. Here the force urging jaws 29 and 30 together is a threaded member 31 and a resilient member 29A; for example, a helical spring surrounding said member 31 maintains jaws 29 and 30 in open position to permit the ready insertion of the coated wire end 25A between said jaws before they are clamped together. The arrangement described in connection with Fig. 4 can be readily adapted to the clamping means described in this paragraph without interfering with the actuation of the pointer 27, or a cam arrangement bearing against jaw 30 can be utilized instead of threaded member 31.

While what has been described hereinbefore is one embodiment of the present invention, said device may be adapted to the testing of other types of material; for example, it may be desirable to test the flexibility of corrugated pipe or flexible shafting to determine the maximum allowable curvature of said material or perhaps to test the flexibility of plastic material. In the aforementioned example it would only be necessary to make the device of the present invention of heavier materials. It should be understood, therefore, that many modifications may be made without departing from the true spirit and scope of the present invention.

What is claimed is:

1. Apparatus for testing the flexibility of flexible linear members, comprising supporting means having attached thereto an arcuate scale, a pivot pin mounted on said supporting means at the center of the arc of said scale, a pointer mounted for rotation on said pin and radially positioned with respect to said scale, means supported on said pointer for clamping the member to be tested, and a second clamping means relatively fixed with respect to said first clamping means and spaced therefrom, said pointer having a zero reference position in which the clamping surfaces of said clamping means are disposed linearly with respect to each other, said clamping surfaces being located on opposite sides of said pin when said pointer is in said reference position, whereby the member to be tested may be clamped between said two clamping means and whereby when said pointer is rotated from said zero position a loop is formed in the tested member between said two clamping means.

2. Apparatus for testing the flexibility of flexible linear members, comprising substantially horizontal planar supporting means having attached thereto a substantially horizontal planar arcuate scale, a vertical pivot pin mounted on said supporting means at the center of the arc of said scale, a pointer mounted for rotation on said pin in a horizontal plane and radially positioned with respect to said scale, means supported on said pointer for clamping the member to be tested, and a second clamping means fixedly attached to said supporting means and spaced from said first clamping means, said pointer having a zero reference position in which the clamping surfaces of said clamping means are disposed linearly with respect to each other and in substantially vertical planes, said clamping surfaces being located on opposite sides of said pin when said pointer is in said reference position, whereby the member to be tested may be clamped substantially horizontally between said two clamping means and whereby when said pointer is rotated from said zero position a loop is formed in the tested member between said two clamping means.

MAURITZ L. ANDERSON.

REFERENCES CITED

The following references are of record in the file of this patent:

UNITED STATES PATENTS

| Number | Name | Date |
| --- | --- | --- |
| 1,152,797 | Cruser | Sept. 7, 1915 |
| 1,447,185 | Sammet | Mar. 6, 1923 |
| 1,617,938 | Bouvier | Feb. 15, 1927 |
| 1,906,340 | Scott | May 2, 1933 |
| 2,207,502 | Zamboni | July 9, 1940 |

FOREIGN PATENTS

| Number | Country | Date |
| --- | --- | --- |
| 268,731 | Great Britain | Aug. 25, 1927 |